US009910266B2

(12) United States Patent
Jungwirth et al.

(10) Patent No.: US 9,910,266 B2
(45) Date of Patent: Mar. 6, 2018

(54) SPECTRAL BALANCING TECHNIQUE (71) Applicant: The Boeing Company, Chicago, IL (US)

(72) Inventors: Douglas Ralph Jungwirth, Porter Ranch, CA (US); Gregory Alexander Campbell, Granada Hills, CA (US)

(73) Assignee: THE BOEING COMPANY, Chicago, IL (US)

( * ) Notice: Subject to any disclaimer, the term of this patent is extended or adjusted under 35 U.S.C. 154(b) by 123 days.

(21) Appl. No.: 13/967,884

(22) Filed: Aug. 15, 2013

(65) Prior Publication Data
US 2015/0049386 A1    Feb. 19, 2015

(51) Int. Cl.
*G02B 5/18* (2006.01)
*G02B 27/44* (2006.01)
*G02B 26/00* (2006.01)
*G01J 1/04* (2006.01)
*G01J 3/18* (2006.01)
(Continued)

(52) U.S. Cl.
CPC .......... *G02B 26/007* (2013.01); *G01J 1/0437* (2013.01); *G01J 1/0488* (2013.01);
(Continued)

(58) Field of Classification Search
CPC .......... G02F 1/353; G02F 1/3534; G02F 1/35; G02F 2203/055; G02F 1/011;
(Continued)

(56) References Cited

U.S. PATENT DOCUMENTS 4,232,943 A * 11/1980 Rogers ............... G02B 9/34
                                                        359/726
7,755,758 B2    7/2010 Mastle
(Continued)

FOREIGN PATENT DOCUMENTS

DE    102005063373 A1 *  5/2007  ............. G01J 1/04
EP         2413019 A1 *  2/2012  ............. F21S 8/006

OTHER PUBLICATIONS

PCT search Report dated Sep. 16, 2014, regarding application PCT/US2014/041198, 10 pages.
(Continued)

*Primary Examiner* — Thomas K Pham
*Assistant Examiner* — Sharrief Broome
(74) *Attorney, Agent, or Firm* — Yee & Associates, P.C.

(57) ABSTRACT

A spectral instrument including a light source configured to produce a light beam, the light beam comprising a plurality of wavelengths, and the light beam being about collimated or pseudo-collimated. The spectral instrument also includes a spectral dispersion device in optical communication with the light source. The spectral instrument also includes a screen disposed in the optical path after the spectral dispersion device. The screen comprises a material configured to be substantially opaque to at least some of the plurality of wavelengths. The screen is sized and dimensioned to at least partially block selected ones of the plurality of wavelengths. The screen is movable with respect to an axis of the screen. The spectral instrument also includes an imaging lens disposed in the optical path and disposed either after the screen or before the screen.

17 Claims, 6 Drawing Sheets (51) Int. Cl.
*G01J 3/02* (2006.01)
*G01J 3/12* (2006.01)

(52) U.S. Cl.
CPC .......... *G01J 1/0492* (2013.01); *G01J 3/0229* (2013.01); *G01J 3/18* (2013.01); *G01J 2003/1208* (2013.01); *G01J 2003/1282* (2013.01); *G01J 2003/1828* (2013.01)

(58) Field of Classification Search
CPC . G02F 1/01708; G02B 5/1814; G02B 5/1866; G02B 27/4205; G02B 5/203; G02B 5/1842; G02B 5/1861; G02B 6/10; G02B 2005/1804
USPC .... 385/4, 130, 131; 359/326, 558, 563, 566, 359/569
See application file for complete search history.

(56) References Cited

U.S. PATENT DOCUMENTS

| | | | |
|---|---|---|---|
| 2003/0161042 A1* | 8/2003 | Long | 359/566 |
| 2003/0179804 A1* | 9/2003 | Cook et al. | 372/100 |
| 2006/0245754 A1* | 11/2006 | Valette et al. | 398/43 |
| 2007/0296969 A1* | 12/2007 | Goldstein | G01J 3/02 356/328 |
| 2009/0201498 A1 | 8/2009 | Raskar et al. | |
| 2009/0256927 A1* | 10/2009 | Komiya et al. | 348/222.1 |

OTHER PUBLICATIONS

International Preliminary Report on Patentability, dated Feb. 16, 2016, regarding Application No. PCT/US2014/041198, 7 pages.

* cited by examiner

SPECTRAL BALANCING TECHNIQUE

BACKGROUND INFORMATION

1. Field

The present disclosure relates generally to optics, and more particularly to a technique for balancing a spectral output of a light source.

2. Background

Many scientific applications require a specific spectrum of light to perform specific measurements. Available light sources sometimes do not have that desired spectrum. Thus, for some applications, an available light source may be selected and then optics used to modify the output spectrum of the light source to approximately match the desired spectrum.

Standard techniques using dielectric coatings and absorbing filters to modify or balance the available spectrum sometimes have unwanted side effects or features. For example, dielectric coatings have limited spectral range and have many out of band transmission anomalies. Absorbing filters have limited range and spectral bandwidth, and may in some cases attenuate the total desired luminosity.

Thus, existing techniques for modifying the spectral output of a light source may have undesirable features. Therefore, it would be desirable to have a method and apparatus that take into account at least some of the issues discussed above, as well as other possible issues.

SUMMARY

The illustrative embodiments provide for a spectral instrument. The spectral instrument includes a light source configured to produce a light beam, the light beam comprising a plurality of wavelengths, and the light beam being about collimated or pseudo-collimated. The spectral instrument also includes a spectral dispersion device in optical communication with the light source. The spectral instrument also includes a screen disposed in the optical path after the spectral dispersion device. The screen comprises a material configured to be substantially opaque to at least some of the plurality of wavelengths. The screen is sized and dimensioned to at least partially block selected ones of the plurality of wavelengths. The screen is movable with respect to an axis of the screen. The spectral instrument also includes an imaging lens disposed in the optical path and disposed either after the screen or before the screen.

The illustrative embodiments also provide for a method. The method includes breaking an optical beam into a plurality of wavelengths using a first spectral dispersion device. The method further includes after breaking, at least partially blocking transmission of selected ones of the plurality of wavelengths, wherein a filtered plurality of wavelengths is produced. The method further includes imaging the filtered plurality of wavelengths on a second spectral dispersion device. The method further includes recombining the filtered plurality of wavelengths using the second spectral dispersion device.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account the issues described above with respect to the sometimes unwanted side effects or features of standard techniques using dielectric coatings and absorbing filters to modify or balance the available spectrum of a light source. The illustrative embodiments also recognize and take into account that many scientific applications require a specific spectrum of light to perform specific measurements, but that available light sources sometimes do not have a desired spectrum. The illustrative embodiments recognize and take into account that in some applications, active spectral adjustability is desired or required.

Thus, the illustrative embodiments break up an optical beam of a light source into various spectral bands, and then tune or filter small portions of the spectral bands individually. The illustrative embodiments start with a collimated or pseudo-collimated source beam and send that beam into a prism or diffraction grating. A prism and a diffraction grating are examples of dispersion devices. In whatever form, the dispersion device splits the beam into a continuous fan of beams; the angles of the resultant beams are dependent on the wavelength of the light.

The illustrative embodiments contemplate placing screens, masks, or even apertures in the line of the fan of beams at specific locations to block or attenuate undesired wavelengths within the fan of beams. The percentage of light blocked by these apertures may depend on a number of factors. A non-limiting list of examples includes a width of the screen, transmission percentage of the screen, location of the screen, and orientation of the screen with respect to the optical plane of the dispersion device. Other factors can also influence which wavelengths are blocked or attenuated.

In addition, the illustrative embodiments contemplate placing an imaging optic in the beam to collect all of the remaining light and re-image that light into an identical prism or diffraction grating. In an illustrative embodiment, the imaging optic, such as a convex lens, may perform one-to-one (1:1) imaging. However, other imaging optics may be used and other imaging ratios may be used. Accordingly, these examples are not necessarily limiting of the claimed inventions.

The imaged beam may then be transmitted towards a second dispersion device. The second dispersion device may be inverted or otherwise oriented such that the light exiting the second dispersion device has been spectrally modified, but has the same size, shape and propagation characteristics as the incoming optical beam of the light source.

The illustrative embodiments contemplate that each individual screen, mask, or even aperture will cause a reduction of a certain part of the spectrum. This notch in the spectral transmission, created by the screen, may be dependent on a number of factors. These factors may include, but are not limited to, which wavelength the aperture is centered on, a width of the aperture, divergence of an incoming beam, alignment of the aperture with the vertical axis of the optical system defined by the angle of the first dispersion device, and the transmissibility of the screen material.

As mentioned above, although the illustrative embodiments contemplate the use of a screen, this term is not necessarily limited to traditional screens. As used herein, a "screen" is any device that may be used to block one or more particular wavelengths of light. Therefore, the term "screen" contemplates a mask, an aperture that is configured to block one or more wavelengths of light, a mask, baffles, filters, and other means for blocking light. The screen may be a continuous mask, instead of several individual apertures. The screen may be partially transmissible to one or more wavelengths of light of interest. As used herein, an "opaque" screen is opaque to substantially all wavelengths of light in a selected range of wavelengths. Typically this range will be a desired range of wavelengths. In some cases this range may be in the visible or near visible spectrum.

The illustrative embodiments contemplate that the screen may move. Thus, the screen may be scanned across various wavelengths to actively modify the spectrum for some measurements. The screen also may be mechanically manipulated to create an effective width that oscillates in time. This latter action may produce a modulated notch in the spectrum for measurement purposes. This latter action may also be accomplished in one particular non-limiting illustrative embodiment by spinning a thin rectangular aperture about its long axis.

Thus, the movable screen may, in some cases, translate and rotate through a volume of space on one side or another of the imaging optics. By translation and rotation, a desired notch or set of notches in the spectrum of the light source may be blocked or attenuated. In some cases, rotation of the screen may change an effective width of the notch or notches in the spectrum. In some cases, translation of the screen along an axis of the imaging optics or of the screen itself may change a center wavelength of the notch or notches in the spectrum.

Figure 1:
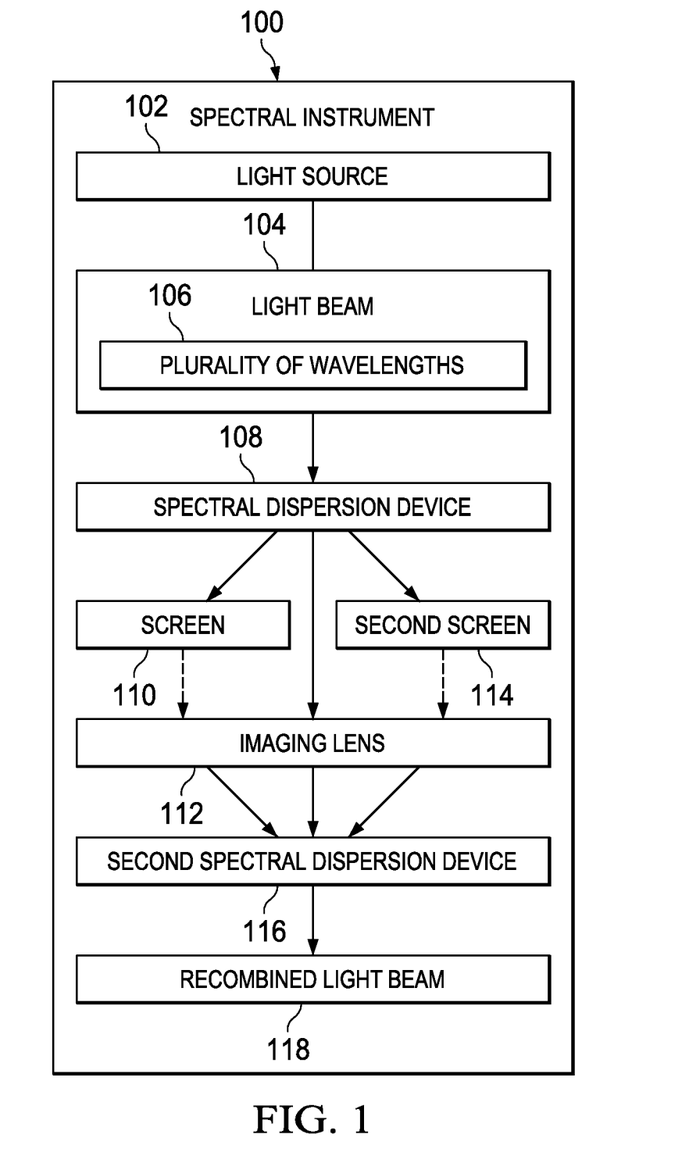
FIG. 1 is an illustration of a block diagram of a spectral instrument, in accordance with an illustrative embodiment.

Attention is now turned towards the Figures. FIG. 1 is an illustration of a block diagram of a spectral instrument, in accordance with an illustrative embodiment. Spectral instrument 100 may be used to modify the spectral output of a light source, such as light source 102.

Light source 102 may be configured to produce light beam 104. Light beam 104 may be composed of plurality of wavelengths 106. Light beam 104 may be about collimated or pseudo-collimated.

Spectral instrument 100 also may include spectral dispersion device 108 in optical communication with light source 102. Spectral dispersion device 108 may be a diffraction grating, a prism, both a diffraction grating and a prism, or any other opto-electrical equipment configured to disperse light. Spectral dispersion device 108 may disperse plurality of wavelengths 106 into a fan of separated wavelengths.

Spectral instrument 100 may also include screen 110. Screen 110 may be disposed in the optical path of the light after spectral dispersion device 108. Screen 110 may be composed of a material configured to be substantially opaque to at least some of plurality of wavelengths 106. Screen 110 may be sized and dimensioned to at least partially block selected ones of plurality of wavelengths 106. Screen 110 may be movable with respect to an axis of screen 110 or with respect to imaging lens 112.

Spectral instrument 100 may further include this imaging lens 112. Imaging lens 112 may be disposed in the optical path and disposed either after screen 110 or before screen 110. Imaging lens 112 may be any kind of imaging optics. An example of imaging lens 112 may be a convex lens configured to converge plurality of wavelengths 106 back to a focal point of imaging lens 112.

In an illustrative embodiment, screen 110 is a first screen. In this case, spectral instrument 100 may include second screen 114 disposed in the optical path after spectral dispersion device 108. Second screen 114 may be composed of a material configured to be substantially opaque to at least some of plurality of wavelengths 106. Second screen 114 may be sized and dimensioned to at least partially block selected different ones of plurality of wavelengths 106. Second screen 114 may be movable with respect to an axis of second screen 114, or with respect to imaging lens 112.

In an illustrative embodiment, screen 110 and second screen 114 may be physically connected so that translation of one translates the other. In an illustrative embodiment, screen 110 and second screen 114 are configured to move independently of each other. In yet another illustrative embodiment, screen 110 and second screen 114 may lie along a same axis on one side of imaging lens 112. In still another illustrative embodiment, screen 110 and second screen 114 may be on opposite sides of imaging lens 112. In further illustrative embodiments, more or fewer screens may be present.

In another illustrative embodiment, screen 110 may be located a first distance from second screen 114. Both screens may lie on the same axis. Spectral dispersion device 108 may be configured to separate two wavelengths of plurality of wavelengths 106 such that, after plurality of wavelengths 106 has traveled a second distance along the optical path, the two wavelengths are separated by a third distance. The first distance may be selected to correspond to the third distance. Thus, the screen or screens may be placed to intercept precisely the desired wavelengths as those wavelengths that are separated by spectral dispersion device 108. The arrows between screen 110 and imaging lens 112 and between second screen 114 and imaging lens 112 are dashed. These dashed arrows indicate that the light at the selected wavelengths is attenuated or blocked.

In an illustrative embodiment, screen 110 may be configured to partially block a first wavelength in plurality of wavelengths 106. Likewise, second screen 114 may be configured to substantially completely block a second wavelength in plurality of wavelengths 106.

In an illustrative embodiment wherein, in being configured to be movable, screen 110 may be configured to selectively block ones of plurality of wavelengths 106. Additionally, in being configured to be movable, screen 110 may be configured to selectively change transmissibility of a particular wavelength in plurality of wavelengths 106. In another illustrative embodiment, in being configured to be movable, screen 110 may be configured to selectively block ones of plurality of wavelengths 106 and also, in being configured to be movable, screen 110 may be also configured to selectively change transmissibility of a particular wavelength in plurality of wavelengths 106. In other illustrative embodiments, second screen 114, in being configured to move, may perform as described above.

Still further, in being movable, screen 110 may be configured to translate along an axis of screen 110. Further yet, in being movable, screen 110 may be configured to rotate along an axis of screen 110. In another illustrative embodiment, in being movable, screen 110 may be configured to both rotate about a first axis of screen 110 and to translate along a second axis of screen 110. In other illustrative embodiments, second screen 114, in being configured to move, may perform as described above.

In an illustrative embodiment, screen 110 or second screen 114 may be a rectangular plate. In this case, if movable, screen 110 (or second screen 114) may be configured to both rotate about a first axis of screen 110 (or second screen 114) and to translate along a second axis of screen 110 (or second screen 114).

Imaging lens 112 may have different properties. In an illustrative embodiment, imaging lens 112 may be a convex shape. Imaging lens 112 may have other shapes that have one or more focal points. Imaging lens 112 may be multiple lenses or optics operating together. Imaging lens 112, if composed of multiple optics, may also include filters, baffles, mirrors, splitters, and other opto-electrical equipment configured to modify properties of light beam 104. In one illustrative embodiment, imaging lens 112 may focus what remains of plurality of wavelengths 106 onto a single focal point. In other illustrative embodiments, imaging lens 112 may include additional optics that split light beam 104. Imaging lens 112 may be a complex lens that has multiple focal points to focus different ones of plurality of wavelengths on different focal points. Thus, the illustrative embodiments are not necessarily limited to imaging light beams onto a single output or single device.

However, in one specific example, the illustrative embodiments contemplate that spectral dispersion device 108 is a first spectral dispersion device. In this case, spectral instrument 100 may further include second spectral dispersion device 116 disposed in the optical path after imaging lens 112. Second spectral dispersion device 116 may be configured to emit recombined light beam 118 having substantially similar propagation properties as light beam 104. For example, second spectral dispersion device 116 may be an inverted prism that recombines plurality of wavelengths 106. However, second spectral dispersion device 116 may be any suitable device, such as a diffraction grating, and may also be considered multiple spectral dispersion devices operating together. Thus, for example, second spectral dispersion device 116 may be selected from a group consisting of a prism, a diffraction grating, and both a prism and a diffraction grating.

The illustrative embodiments described with respect to FIG. 1 may be varied. Thus, the illustrative embodiments described above do not necessarily limit the claimed inventions. For example, more or fewer screens may be present. The screens may be masks or apertures sized and dimensioned to block particular wavelengths. In still other illustrative embodiments, screen 110 may substantially block or attenuate all of plurality of wavelengths of light 106 emitted by light source 102, but in this case screen 110 may instead be provided with apertures sized and dimensioned to only allow desired wavelengths to pass to imaging lens 112. In yet other illustrative embodiments, imaging lens 112 need not be present. In still other illustrative embodiments, second spectral dispersion device 116 need not be present. Thus, the examples given above again do not necessarily limit the claimed inventions.

Figure 2:
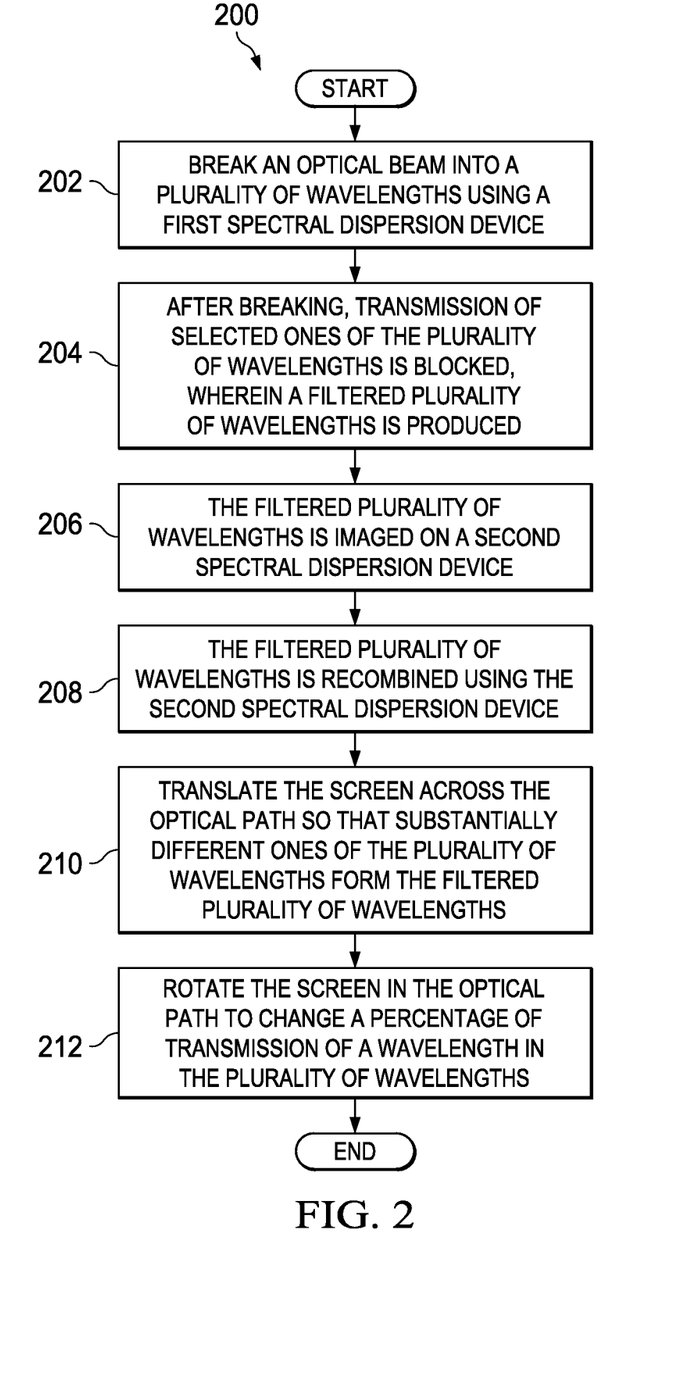
FIG. 2 is a flowchart illustrating use of a spectral instrument, in accordance with an illustrative embodiment.

FIG. 2 is a flowchart illustrating use of a spectral instrument, in accordance with an illustrative embodiment. Process 200 may be implemented using a spectral instrument, such as spectral instrument 100 of FIG. 1, spectral instrument 300 of FIG. 3, spectral instrument 400 of FIG. 4, or spectral instrument 500 of FIG. 5.

Process 200 may begin by breaking an optical beam into a plurality of wavelengths using a first spectral dispersion device (operation 202). After breaking, transmission of selected ones of the plurality of wavelengths is blocked, wherein a filtered plurality of wavelengths is produced (operation 204).

Next, the filtered plurality of wavelengths is imaged on a second spectral dispersion device (operation 206). The filtered plurality of wavelengths is recombined using the second spectral dispersion device (operation 208).

In an illustrative embodiment, at least partially blocking is performed using a screen. In this case, process 200 optionally may further include translating the screen across the optical path so that substantially different ones of the plurality of wavelengths form the filtered plurality of wavelengths (operation 210). In another illustrative embodiment wherein at least partially blocking is performed using a screen, process 200 optionally may further include rotating the screen in the optical path to change a percentage of transmission of a wavelength in the plurality of wavelengths (operation 212). In another illustrative embodiment, both translation and rotation may occur simultaneously. The process may terminate thereafter.

Figure 3:
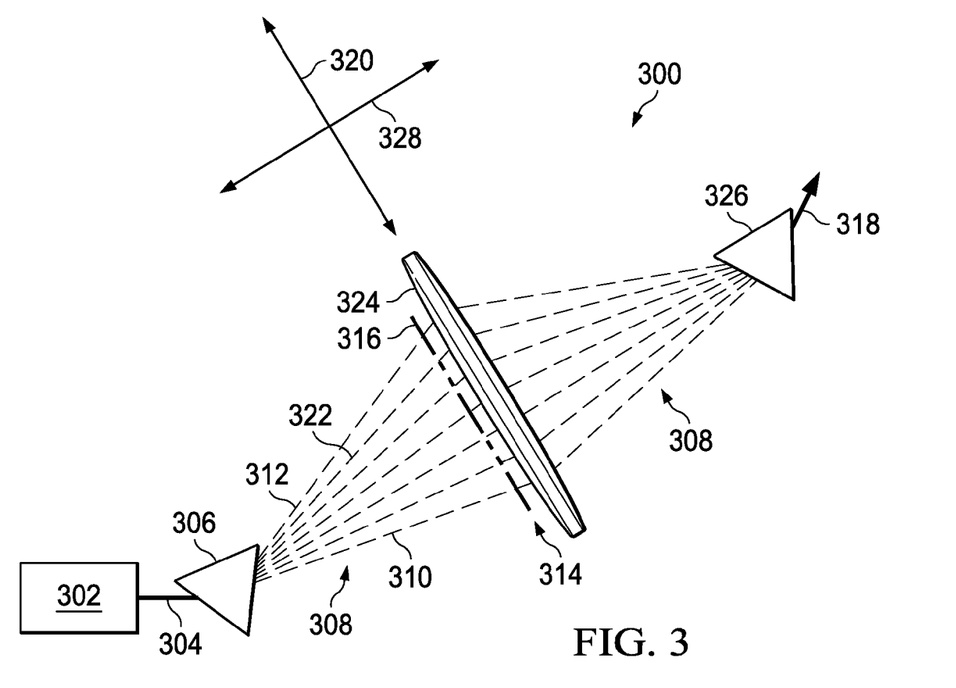
FIG. 3 illustrates a spectral instrument, in accordance with an illustrative embodiment.

The process described with respect to FIG. 3 may be varied. More or fewer operations may be present. Additional optics may be inserted in order to change the propagation properties of the light beam or to change the destination of one or more of the plurality of wavelengths. Thus, the illustrative embodiments are not necessarily limiting of the claimed inventions.

FIG. 3 is an illustration of a spectral instrument, in accordance with an illustrative embodiment. Spectral instrument 300 represents a specific example of spectral instrument 100 of FIG. 1. Spectral instrument 300 may be used to perform process 200 of FIG. 2. Although spectral instrument 300 represents a specific example, the features of spectral instrument 300 do not necessarily limit the claimed inventions.

Spectral instrument 300 includes light source 302, which produces light beam 304. Light beam 304 may be composed of multiple wavelengths.

Spectral instrument 300 also includes dispersion device 306. While dispersion device 306 is shown as a prism in FIG. 3, dispersion device may be a diffraction grating, other type of light dispersion device, or multiple dispersion devices operating together. Additionally, if dispersion device 306 is a prism, then the prism may be coated with a selected substance to change the transmissibility or spectral dispersive properties of the prism with respect to one or more different wavelengths.

Whatever the form of dispersion device 306, the effect of dispersion device 306 is to disperse light beam 304 into plurality of wavelengths 308. Although plurality of wavelengths 308 was inherently present in light beam 304 before dispersion, dispersion device 306 disperses plurality of wavelengths 308 into a fan of beams. In a specific, non-limiting example presented for ease of understanding, dispersion device 306 may be a right angle triangular prism and light source 302 may produce visible light in the form of light beam 304. In this case, dispersion device 306 may emit a fan, or rainbow, of colors. Which colors are produced depend on the properties of light source 302. However, the illustrative embodiments are not necessarily limited to prisms or to the use of only visible light. For example, the illustrative embodiments may also operate with respect to ultraviolet or infrared light.

In any case, dispersion device 306 disperses light beam 304 into plurality of wavelengths 308. Plurality of wavelengths 308 may include, for example, first beam 310 and second beam 312, though possibly many more beams may be present in plurality of wavelengths 308. First beam 310 may represent one wavelength of light, or narrow range of wavelengths of light. Second beam 312 may represent another wavelength of light, or another narrow range of wavelengths of light.

In an illustrative embodiment, one or both of first beam 310 and second beam 312 may be undesirable. In other words, one or both of first beam 310 and second beam 312 may represent undesirable wavelengths that a user desires to remove from the spectrum produced by light source 302. Other beams or wavelengths in plurality of wavelengths 308 may also be considered to be undesirable. Stated in the positive, only some of the beams or wavelengths in plurality of wavelengths 308 may be desirable.

Thus, the illustrative embodiments provide for one or more screens, such as screens 314. Although a number of screens are shown in FIG. 3, more or fewer screens may be present. In some illustrative embodiments, screens 314 may represent only one screen blocking only one wavelength of light. Individual ones of screens 314 may be of different shapes and sizes.

In any case, screens 314 may be configured to block or attenuate one or more wavelengths of light and in particular, may be configured to block or attenuate a range of wavelengths that include a particular wavelength to be blocked. Thus, for example, individual screen 316 may be configured to block second beam 312. However, in some illustrative embodiments, screens 314 each may be configured to block substantially all wavelengths emitted by light source 302. Thus, as described below, when one or more of screens 314 are translated, different ones of plurality of wavelengths 308 may be blocked to dynamically change the spectral characteristics of output beam 318.

When a user desires to block or attenuate a particular wavelength of light, the user may cause one or more of screens 314 to be placed into the path of a particular wavelength to be blocked or attenuated. Thus, for example, if a user desires to block or attenuate second beam 312, then the user may cause individual screen 316 to be placed in the path of second beam 312.

Screens 314 may be translated along axis 320. Thus, the position of screens 314 with respect to plurality of wavelengths 308 may be altered. Because the position of plurality of wavelengths 308 remains about constant, adjusting the position of screens 314 along axis 320 will change which ones of plurality of wavelengths 308 will be blocked or attenuated. In a specific example, moving individual screen 316 downwardly with respect to axis 320 may cause individual screen 316 to move from blocking second beam 312 to instead be blocking third beam 322.

The ability of screens 314 to move may allow a user to dynamically change the spectral output of output beam 318. If screens 314 move back and forth along axis 320 in a periodic fashion, then periodic changes in the spectral output result in output beam 318.

The mechanism for translating screens 314 may be manual or automatic or a combination thereof. If manual, a mechanical system may be in place to allow a user to physically move screens 314 along axis 320. If automatic, then a motor may drive a mechanical system that moves screens 314 along axis 320. In an illustrative embodiment, a computer system may control the motor such that the computer in effect controls the positions of screens 314.

Screens 314 may be controlled individually, together, or a combination thereof. Thus, for example, in some illustrative embodiments, all of screens 314 are mechanically linked so that movement of one moves the others. In other illustrative embodiments, one or more or possibly all of screens 314 may be moved individually. However, some of screens 314 may be linked and thus move together, and simultaneously others of screens 314 may be moved individually.

Screens 314 may also be rotatable about their own individual axes. Thus, for example, each of screens 314 may be able to rotate about an axis that extends into and out of the page shown for FIG. 3. However, screens 314 may also be rotatable about axis 320, or even about a corresponding axis parallel to axis 328.

Rotation of a screen may change the range of wavelengths blocked, and thus change the width of a notch etched into the spectral output of output beam 318. For example, rotation of individual screen 316 about an axis extending into and out of the page of FIG. 3 may cause fewer or more of those wavelengths present in second beam 312 to be blocked. Depending on the type of material used for individual screen 316, rotation of individual screen 316 may also change the transmissibility of the wavelengths present in second beam 312.

Thus, the illustrative embodiments contemplate that, in being configured to be movable, a screen may be configured to selectively block ones of the plurality of wavelengths; and, in being configured to be movable, the screen also may be configured to selectively change transmissibility of a particular wavelength in the plurality of wavelength. In this case, the spectral instrument may further include a motor connected to the screen and a computer connected to the motor. The computer may be configured to cause the motor to actuate and thereby cause the screen to move a desired amount.

However, the illustrative embodiments are not limited to the axes described above. Any or all of screens 314 may be translatable along any selected axis. Any or all of screens 314 may be rotatable about any selected axis. Thus, the illustrative embodiments shown in FIG. 3 are not necessarily limiting of the claimed inventions.

Screens 314 may be varied. For example, more or fewer screens may be present. The screens may be masks or apertures sized and dimensioned to block particular wavelengths. In still other illustrative embodiments, screens 314 may be replaced with a single screen that substantially blocks or attenuates all of plurality of wavelengths 308 emitted by light source 302. However, in this case, the single screen may instead be provided with apertures sized and dimensioned to only allow desired wavelengths to pass. In still other illustrative embodiments, a combination of screen types may be used. Hence, for example, some of screens 314 may be masks, some of screens 314 may be actual screens, some of screens 314 may be filters, and some of screens 314 may block all of a range of wavelengths of plurality of wavelengths 308 but may have apertures that allow certain wavelengths to pass. Thus, the examples given above again do not necessarily limit the claimed inventions.

Spectral instrument 300 also may include imaging lens 324. Imaging lens 324 may be placed after screens 314 in the optical path of plurality of wavelengths 308. Imaging lens 324 may be a convex imaging lens, but may be other optics as described below. The function of imaging lens 324 is to focus plurality of wavelengths 308 on about a single point. That point may be second dispersion device 326.

Second dispersion device 326 may be a prism, as shown in FIG. 3, but may also be a diffraction grating or other dispersion device. In the illustrative embodiments shown, second dispersion device 326 is inverted with respect to dispersion device 306. Thus, as the focused beams of plurality of wavelengths 308 are imaged onto second dispersion device 326, plurality of wavelengths 308 are recombined into a single output, output beam 318. Output beam 318 may have the same propagation characteristics as light beam 304. However, relative to light beam 304, output beam 318 has had certain wavelengths of light attenuated or blocked by the operation of screens 314. In this manner, a desired spectral output of output beam 318 may be achieved.

The illustrative embodiments described above may be varied. For example, imaging lens 324 may instead be any optics or set of optics that focuses plurality of wavelengths 308 on one or more points in space. Thus, imaging lens 324 may be replaced with other types of optics, such as focusing mirrors or other optics. In another example, imaging lens 324 may have other shapes and may have multiple focal points.

Still other variations of spectral instrument 300 are possible. In another example, screens 314 may be placed after imaging lens 324 in the optical path of plurality of wavelengths 308. In another example, screens 314 may be placed before and after imaging lens 324.

Still other variations of spectral instrument 300 are possible. For example, imaging lens 324 may have multiple focal points, or may be replaced with beam splitters or other optics that focus different portions of plurality of wavelengths 308 on different points in space. In this case, multiple different dispersion devices may be present to recombine plurality of wavelengths 308 into multiple output beams, each having the same or different portions of the spectrum of light beam 304.

Given the variations possible to the illustrative embodiments shown in FIG. 3, the illustrative embodiments described herein do not necessarily limit the claimed inventions. Additionally, the illustrative embodiments described herein contemplate other variations ascertainable to those of skill in the art.

Figure 4:
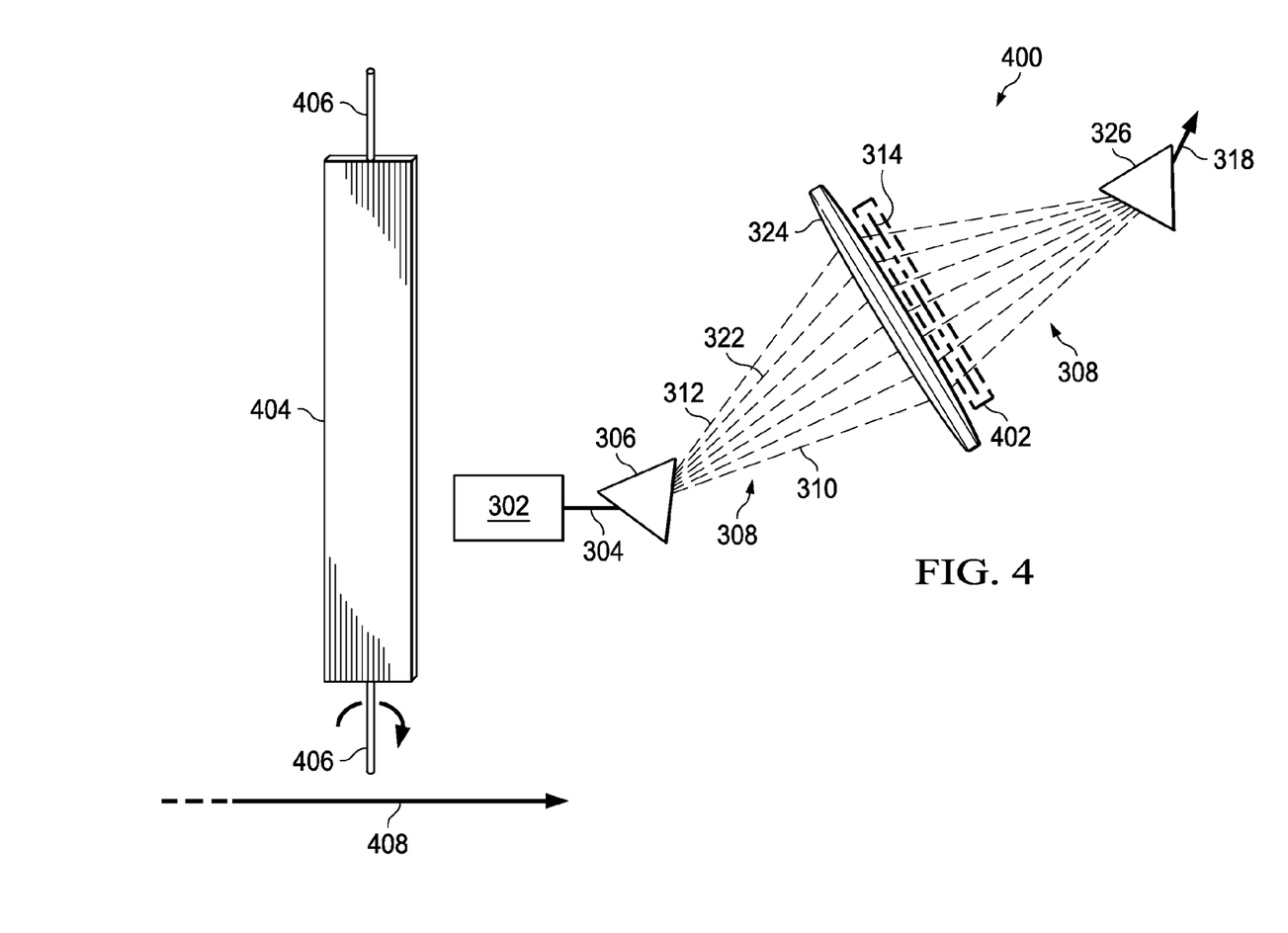
FIG. 4 illustrates a spectral instrument, in accordance with an illustrative embodiment.

FIG. 4 is an illustration of a spectral instrument, in accordance with an illustrative embodiment. Spectral instrument 400 of FIG. 4 is similar to spectral instrument 300 of FIG. 3. Thus, reference numerals common to FIG. 3 and FIG. 4 may describe substantially similar components and have similar functions and descriptions. Likewise, the variations described with respect to FIG. 3 also apply to FIG. 4.

As shown in FIG. 4, screens 314 are disposed after imaging lens 324 with respect to the optical path of plurality of wavelengths 308. However, as with FIG. 3, screens 314 may be disposed before imaging lens 324.

In an illustrative embodiment, screens 314 may be translatable and rotatable within volume 402. Translation and rotation of one or more screens 314 may block out notches in the spectrum of output beam 318.

FIG. 4 shows a close-up drawing of an exemplary screen among screens 314. Screen 404 is an example of one of screens 314. Screen 404 may be a rectangular solid block configured to substantially block or to attenuate light in a range of wavelengths. In some illustrative embodiments that range may be substantially all of the range of wavelengths present in light beam 304.

Screen 404 may be rotated about a long axis of screen 404, which corresponds to support spindle 406. Because of the shape of screen 404, rotating support spindle 406 away from presenting the full face of screen 404 to plurality of wavelengths 308 will narrow the profile of screen 404. Thus, fewer of plurality of wavelengths 308 will be blocked or attenuated. However, if screen 404 is already facing a minimum profile towards plurality of wavelengths 308, then rotating screen 404 about support spindle 406 will cause more of plurality of wavelengths 308 to be blocked or attenuated.

Shape of screen 404 may be varied. For example, screen 404 may have a pear shape so that when screen 404 is rotated the profile of screen 404 substantially does not change in the widest region of screen 404, but the profile of screen 404 does substantially change in the more narrow regions of screen 404. In this case, a narrower portion of plurality of wavelengths 308 will nearly always be blocked or attenuated absent translation of screen 404, but wavelengths outside of the wider portion of screen 404 will experience more or less blocking or attenuation as screen 404 is rotated about support spindle 406. Many shapes are possible to achieve the desired blocking or attenuation effect of screen 404 as it is rotated about support spindle 406. Thus, rotation of screen 404 may change an effective width of a notch in the spectrum of output beam 318.

As mentioned above, screen 404 may be translated along axis 408. Axis 408 may correspond to axis 320 of FIG. 3. By translating screen 404 along axis 408, a user may select which ones of plurality of wavelengths 308 will be blocked or attenuated. Thus, translation of screen 404 may change a center wavelength of a notch in the spectrum of output beam 318.

Figure 5:
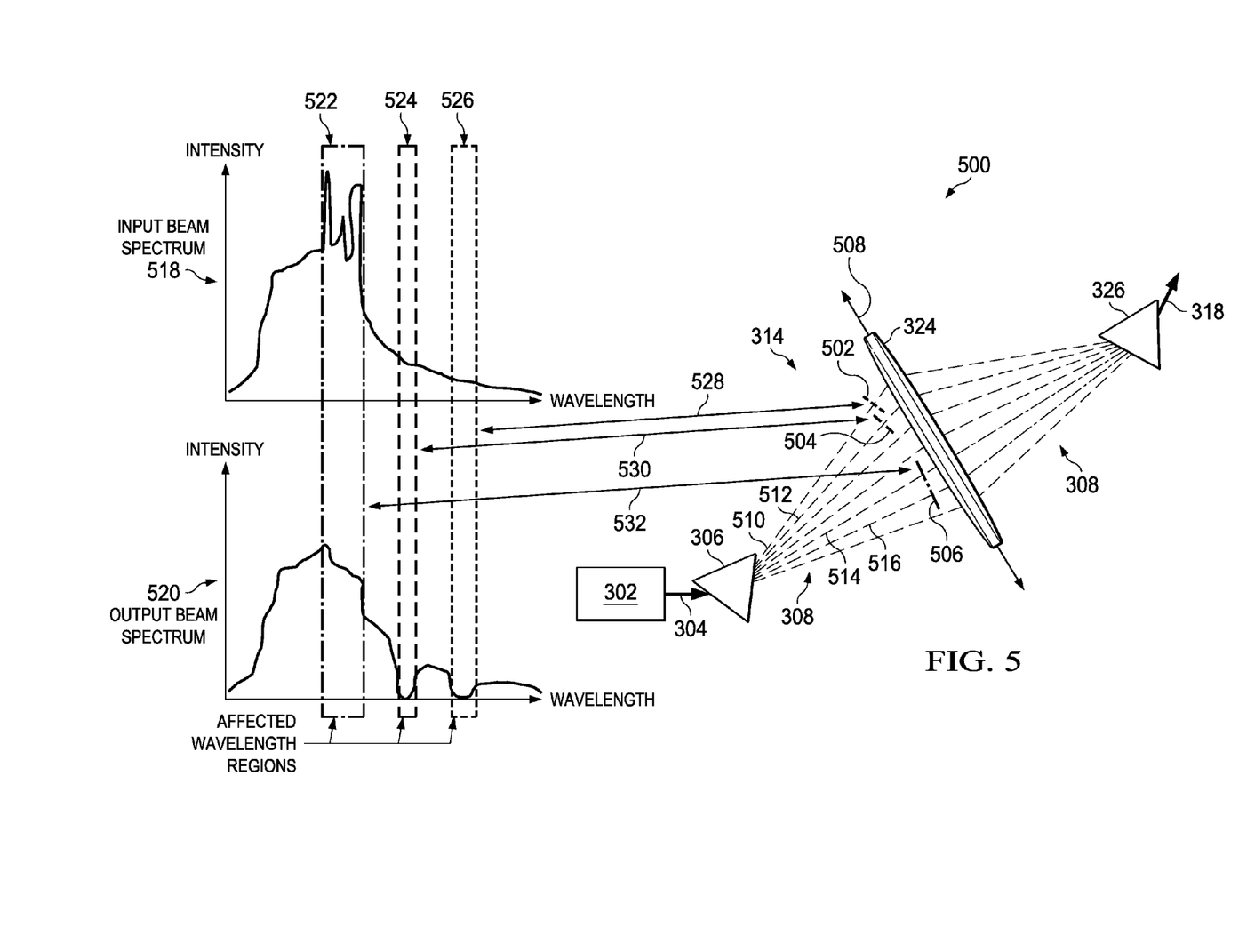
FIG. 5 illustrates some possible effects of using the spectral instrument of FIG. 3 and FIG. 4, in accordance with an illustrative embodiment.

FIG. 5 is an illustration of some possible effects of using the spectral instrument of FIG. 3 and FIG. 4, in accordance with an illustrative embodiment. Spectral instrument 500 of FIG. 5 is similar to spectral instrument 400 of FIG. 4 and spectral instrument 300 of FIG. 3. Thus, reference numerals common to FIG. 3, FIG. 4, and FIG. 5 may describe substantially similar components and have similar functions and descriptions. Likewise, the variations described with respect to FIG. 3 and FIG. 4 also apply to FIG. 5. The arrangement of screens in FIG. 5 is exemplary only and do not necessarily limit the claimed inventions.

As mentioned above, spectral instrument 500 is substantially similar to spectral instrument 300 of FIG. 3. However, in spectral instrument 500, screens 314 consist of three sets of screens: first screen 502, second screen 504, and third screen 506. Each of these sets of screens may be multiple screens acting in tandem.

As shown in FIG. 5, first screen 502 is positioned along axis 508 in order to block set of wavelengths 510 of plurality of wavelengths 308. Second screen 504 is positioned along axis 508 in order to block set of wavelengths 512. As used herein, a "set" means one or more items. Third screen 506 is positioned along axis 508 in order to attenuate set of wavelengths 514 and set of wavelengths 516. In an illustrative embodiment, set of wavelengths 510 is a pre-determined number of wavelengths of infrared light, set of wavelengths 512 is a pre-determined number of wavelengths of red light, set of wavelengths 514 is a pre-determined number of wavelengths of blue light, and set of wavelengths 516 is a pre-determined number of wavelengths of ultraviolet light. However, these wavelengths may be varied. Each of first screen 502, second screen 504, and third screen 506 may be translatable along axis 508, either individually or together. Each of first screen 502, second screen 504, and third screen 506 may be rotatable, either individually or together.

The net effect of first screen 502, second screen 504, and third screen 506 on the spectral distribution of light beam 304 is shown by comparing graph 518 with graph 520. Both graph 518 and graph 520 show spectral distribution as a measure of wavelength versus intensity or luminosity. In the visible spectrum, blue light has a shorter wavelength, and hence more energy, than red light. Thus, blue light would be closer to the vertices of the graphs along the wavelength axis and red light would be farther from the vertices of both graphs on the wavelength axis. The more intense or luminous the light at a given wavelength, the farther a point is from the vertices of the graphs. Thus, faint light is closer to the vertices of the graphs along the intensity axis and strong light is farther from the vertices of the graphs along the intensity axis.

Graph 518 represents the spectral distribution of light beam 304. Graph 520 represents the spectral distribution of output beam 318. The effects of first screen 502, second screen 504, and third screen 506 on the spectral distribution of output beam 318 are shown in the volumes indicated by the dashed lines intersecting both graphs.

For example, the spectral distribution of light beam 304 from light source 302 contains a number of unwanted wavelengths of light. Specifically, a user may wish to eliminate the spikes in luminosity in wavelength region 522, but not block those wavelengths altogether, in order to smooth out the spectral distribution in wavelength region 522. In addition, the user may wish to substantially eliminate all wavelengths of light in both wavelength region 524 and wavelength region 526.

The placement of first screen 502 substantially eliminates all wavelengths of light from output beam 318 in wavelength region 526, as shown by arrows 528. The placement of second screen 504 substantially eliminates all wavelengths of light from output beam 318 in wavelength region 524, as shown by arrows 530. The placement of third screen 506 substantially eliminates the peaks of wavelengths in wavelength region 522, as shown by arrows 532.

However, in wavelength region 522 the user only wishes to eliminate the peaks in that spectral region without eliminating the peaked wavelengths altogether. Thus, third screen 506 is placed (or a number of screens composing third screen 506 are placed) in order to attenuate light at those peaked wavelengths. To accomplish this effect, third screen 506 may be rotated or may be provided in the form of a filter or a mask in order to attenuate or reduce the light at the peak wavelengths.

The result of eliminating and attenuating the selected wavelengths of light is shown in graph 520. Again graph 520 represents the spectral distribution of output beam 318. As can be seen, the undesirable peaks in wavelength region 522 have been eliminated while still maintaining approximately a smooth curve in intensity over the wavelengths in wavelength region 522. Additionally, the light in wavelength region 524 and wavelength region 526 has been substantially reduced or eliminated. Accordingly, output beam 318 has the desired spectral distribution. In addition, the propagation characteristics of output beam 318 are substantially the same as the propagation characteristics of light beam 304.

Should a user wish to change the spectral distribution of output beam 318, then the user need only translate and/or rotate any one of first screen 502, second screen 504, or third screen 506 in order to affect which wavelengths of light are attenuated or blocked from the spectral distribution. Furthermore, additional screens may be added, or one or more screens may be removed. In combination, taking one or more of these actions may allow a user to modify the spectral distribution of light beam 304 so that output beam 318 is nearly any reduced version of light beam 304.

In still other illustrative embodiments, other optics or light sources may be present. Thus, for example, a second light source with a second input beam may be present. This second input beam may be combined with light beam 304 using one or both of imaging lens 324 and second dispersion device 326 in order to add desired wavelengths to output beam 318. Accordingly, the illustrative embodiments described with respect to FIG. 5 may be varied and do not necessarily limit the claimed inventions.

Figure 6:
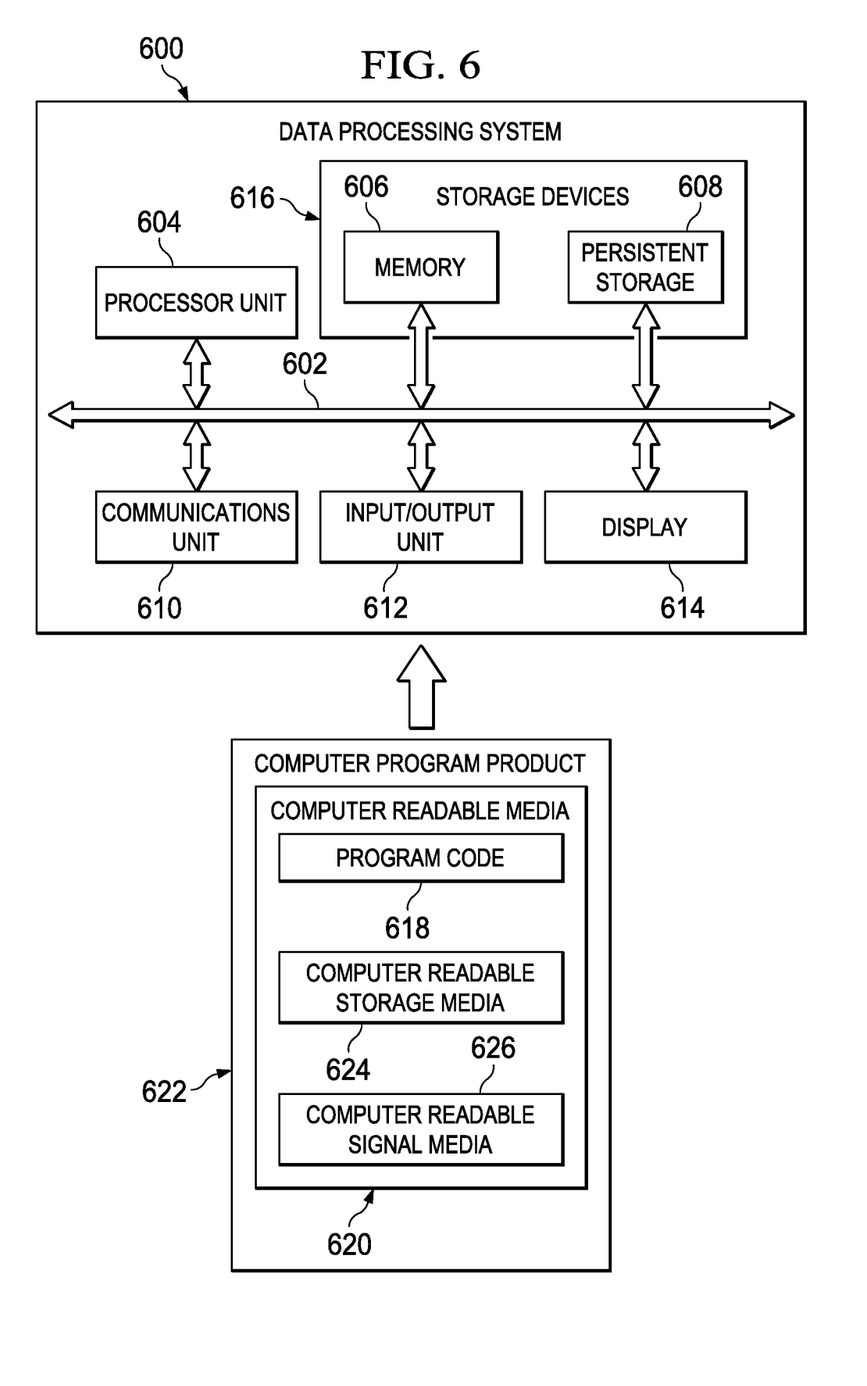
FIG. 6 is an illustration of a block diagram of a data processing system, in accordance with an illustrative embodiment.

FIG. 6 is an illustration of a data processing system, in accordance with an illustrative embodiment. Data processing system 600 in FIG. 6 is an example of a data processing system that may be used, in conjunction with one or more motors, to automate translation and/or rotation of the various screens described elsewhere herein. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Computer readable media 620 may be referred-to as a non-transitory computer readable storage medium. Program code 618 and computer readable media 620 form computer program product 622 in these examples. In one example, computer readable media 620 may be computer readable storage media 624 or computer readable signal media 626. Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 618 may be omitted because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

As another example, a storage device in data processing system 600 is any hardware apparatus that may store data. Memory 606, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606, or a cache, such as found in an interface and memory controller hub that may be present in communications fabric 602.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A spectral instrument comprising:
   a light source configured to produce a light beam, the light beam comprising a plurality of wavelengths, the light beam being about collimated;
   a spectral dispersion device in optical communication with the light source, wherein light passing through the spectral dispersion device becomes dispersed light, and the spectral dispersion device is configured to separate at least two wavelengths of the plurality of wavelengths such that, at a first distance along the optical path, the at least two wavelengths are separated by a second distance;
   a first screen disposed in an optical path after the spectral dispersion device, the first screen comprising a material configured to be substantially opaque to a plurality of wavelengths of light, the first screen sized and dimensioned to at least partially block the plurality of wavelengths, the first screen being movable to rotate about a first axis of the first screen and to translate along a second axis of the first screen, wherein the first screen is positioned to intercept first desired wavelengths of the dispersed light that are separated by the spectral dispersion device;
   a second screen disposed in the optical path, comprising a material configured to be substantially opaque to the plurality of wavelengths of light, the second screen configured to rotate about a first axis of the second screen and to translate along a second axis of the second screen, wherein the first screen is located a third distance from the second screen and wherein the second screen is positioned to intercept second desired wavelengths of the dispersed light that are separated by the spectral dispersion device, the second desired wavelengths different than the first desired wavelengths; and
   an imaging lens disposed in the optical path and disposed either after the first screen or before the first screen, wherein the imaging lens is configured to converge the plurality of wavelengths separated by the dispersion device back to a focal point.

2. The spectral instrument of claim 1, wherein the spectral dispersion device is selected from a group consisting of a prism, a diffraction grating, and both a prism and a diffraction grating.

3. The spectral instrument of claim 1, wherein the second screen is disposed in the optical path after the spectral dispersion device, the second screen sized and dimensioned to at least partially block selected different ones of the plurality of wavelengths.

4. The spectral instrument of claim 3, wherein the first screen and the second screen are physically connected so that translation of one translates the other.

5. The spectral instrument of claim 3, wherein the first screen and the second screen are configured to move independently of each other.

6. The spectral instrument of claim 3, wherein:
   the first screen is located a first distance from the second screen;
   the spectral dispersion device is configured to separate two wavelengths of the plurality of wavelengths such that, after the plurality of wavelengths have traveled a second distance along the optical path, the two wavelengths are separated by a third distance; and
   the first distance is selected to correspond to the third distance.

7. The spectral instrument of claim 3, wherein the first screen is configured to partially block a first wavelength in the plurality of wavelengths and the second screen is configured to substantially completely block a second wavelength in the plurality of wavelengths.

8. The spectral instrument of claim 1, wherein in being configured to be movable, the first screen is configured to selectively block ones of the plurality of wavelengths.

9. The spectral instrument of claim 1, wherein in being configured to be movable, the first screen is configured to selectively change transmissibility of a particular wavelength in the plurality of wavelengths.

10. The spectral instrument of claim 1, wherein in being configured to be movable, the first screen is configured to selectively block ones of the plurality of wavelengths; and, in being configured to be movable, the first screen is also configured to selectively change transmissibility of a particular wavelength in the plurality of wavelength, and wherein the spectral instrument further comprises:
    a motor connected to the first screen; and
    a computer connected to the motor, wherein the computer is configured to cause the motor to actuate and thereby cause the first screen to move a desired amount.

11. The spectral instrument of claim 1, wherein:
    the first screen comprises a rectangular plate.

12. The spectral instrument of claim 1, wherein the imaging lens comprises a convex shape.

13. The spectral instrument of claim 1, wherein the spectral dispersion device comprises a first spectral dispersion device, the spectral instrument further comprising:
    a second spectral dispersion device disposed in the optical path after the imaging lens, and the second spectral dispersion device configured to emit a recombined light beam having substantially similar propagation properties as the light beam.

14. The spectral instrument of claim 13, wherein the second spectral dispersion device is selected from a group consisting of a prism, a diffraction grating, and both a prism and a diffraction grating.

15. The spectral instrument of claim 1, further comprising a rectangular aperture in the first screen, wherein the first screen is movable to create an effective width that oscillates in time by spinning the first screen.

16. A method comprising:
    dispersing an optical beam into a plurality of wavelengths using a first spectral dispersion device, wherein dispersing results in dispersed light;
    after dispersing, using both a first screen and a second screen to at least partially block transmission of selected ones of the plurality of wavelengths, the first screen and the second screen disposed in an optical path of the dispersed light after the first spectral dispersion device, the first screen and the second screen substantially opaque to the plurality of wavelengths, the first screen and the second screen being movable along a first axis that transverses the optical path;
    translating the first screen across a first portion of the optical path along the first axis;

translating the second screen across a second portion of the optical path along the first axis, the first portion and the second portion being different, wherein after passing the first screen and the second screen the dispersed light becomes a filtered plurality of wavelengths;

imaging the filtered plurality of wavelengths on a second spectral dispersion device; and recombining the filtered plurality of wavelengths using the second spectral dispersion device.

17. The method of claim 16 wherein the first screen and the second screen are rotatable, and wherein the method further comprises:

rotating the first screen and rotating the second screen to change which wavelengths are present in the filtered plurality of wavelengths.

* * * * *